(12) United States Patent
Esna Ashari Esfahani et al.

(10) Patent No.: US 12,344,277 B2
(45) Date of Patent: Jul. 1, 2025

(54) AUTHENTICATION SYSTEM FOR A VOICE CONTROLLED AUTONOMOUS DRIVING SYSTEM

(71) Applicant: GM Global Technology Operations LLC, Detroit, MI (US)

(72) Inventors: Alireza Esna Ashari Esfahani, San Bruno, CA (US); Rouhollah Sayed Jafari, Troy, MI (US); Upali P. Mudalige, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 186 days.

(21) Appl. No.: 18/467,923

(22) Filed: Sep. 15, 2023

(65) Prior Publication Data

US 2025/0091617 A1    Mar. 20, 2025

(51) Int. Cl.
| | |
|---|---|
| *B60W 60/00* | (2020.01) |
| *G06F 21/32* | (2013.01) |
| *G06V 40/16* | (2022.01) |
| *G10L 15/22* | (2006.01) |
| *G10L 15/26* | (2006.01) |

(52) U.S. Cl.
CPC .... *B60W 60/0024* (2020.02); *B60W 60/0016* (2020.02); *G06F 21/32* (2013.01); *G06V 40/172* (2022.01); *G10L 15/22* (2013.01); *G10L 15/26* (2013.01); *B60W 2540/21* (2020.02); *B60W 2555/60* (2020.02); *G10L 2015/223* (2013.01)

(58) Field of Classification Search
None
See application file for complete search history.

(56) References Cited

U.S. PATENT DOCUMENTS

| | | | | |
|---|---|---|---|---|
| 9,821,763 | B2 * | 11/2017 | Yuan | B60W 40/08 |
| 12,227,202 | B2 * | 2/2025 | Akash | B60W 50/16 |
| 2017/0305434 | A1 * | 10/2017 | Ratnasingam | G05D 1/0088 |
| 2019/0337521 | A1 * | 11/2019 | Stauber | B60W 40/08 |
| 2020/0086881 | A1 * | 3/2020 | Abendroth | G10L 17/00 |
| 2021/0105619 | A1 * | 4/2021 | Kashani | G10L 15/25 |
| 2023/0095988 | A1 * | 3/2023 | Bhattacharya | G10L 17/06 |
| | | | | 704/232 |
| 2023/0143683 | A1 * | 5/2023 | Suh | B60W 60/00 |
| | | | | 701/23 |

* cited by examiner

*Primary Examiner* — Vivek D Koppikar
*Assistant Examiner* — David Ruben Pedersen
(74) *Attorney, Agent, or Firm* — Vivacqua Crane, PLLC

(57) ABSTRACT

An authentication system for a voice controlled autonomous driving system of a vehicle includes a plurality of perception sensors for collecting perception data indicative of an environment surrounding the vehicle and one or more controllers in electronic communication with one or more autonomous driving controllers of the voice controlled autonomous driving system and the plurality of perception sensors. The voice controlled autonomous driving system determines the trajectory of the vehicle based on a voice command generated by an occupant of the vehicle. The one or more controllers execute instructions to calculate a credibility score of the occupant that quantifies a reliability of one or more voice-based commands generated by the occupant. In response to determining an overall credibility score of the occupant is less than the threshold access score, the one or more controllers adjust an access level of the voice controlled autonomous driving system for the occupant.

20 Claims, 3 Drawing Sheets

AUTHENTICATION SYSTEM FOR A VOICE CONTROLLED AUTONOMOUS DRIVING SYSTEM

INTRODUCTION

The present disclosure relates to an authentication system for a voice controlled autonomous driving system of a vehicle, where the authentication system confirms an occupant of the vehicle generating voice commands is an authorized user and determines an overall credibility score associated with the occupant.

Vehicles are increasingly incorporating additional user experience-related features. For example, an occupant may employ voice commands to operate various features and systems that are part of a vehicle. One example of a system that employs voice commands to control various features and systems of a vehicle is a voice controlled autonomous driving system. A voice controlled autonomous driving system includes a microphone that receives a voice command spoken by a driver or occupant of the vehicle, where the trajectory is determined based on the voice command. However, it is to be appreciated that not all occupants in a vehicle may be trained or have the level of responsibility required to control the trajectory of the vehicle based on voice commands. As an example, one or more passengers of a vehicle may be a child or teenager who does not have the requisite knowledge or maturity required to control the vehicle through voice commands. Furthermore, it is also to be appreciated that some occupants may attempt to test the limits of an autonomous driving system based on voice commands as well.

Thus, while voice controlled autonomous driving systems achieve their intended purpose, there is a need in the art for an improved approach to authenticate and verify users who attempt to control the voice controlled autonomous driving system.

SUMMARY

According to several aspects, an authentication system for a voice controlled autonomous driving system of a vehicle is disclosed. The authentication system includes a plurality of perception sensors for collecting perception data indicative of an environment surrounding the vehicle and one or more controllers in electronic communication with one or more autonomous driving controllers of the voice controlled autonomous driving system and the plurality of perception sensors. The voice controlled autonomous driving system determines a trajectory of the vehicle based on a voice command generated by an occupant of the vehicle. The one or more controllers execute instructions to receive an electrical signal representative of the voice command generated by an occupant of the vehicle, where the voice command indicates a driving maneuver that alters motion of the vehicle. The one or more controllers convert the electrical signal into a text-based command based on one or more speech recognition algorithms. The one or more controllers receive a pre-compiled driving maneuver indicated by the text-based command, a feasibility message indicating a feasibility of the pre-compiled driving maneuver, a statutory message indicating an authorization status of the pre-compiled driving maneuver, and an execution message indicating an execution status of the pre-compiled driving maneuver from the one or more autonomous driving controllers. The one or more controllers calculate a credibility score of the occupant based on the pre-compiled driving maneuver, the feasibility of the pre-compiled driving maneuver, the authorization status of the pre-compiled driving maneuver, the execution status of the pre-compiled driving maneuver, and the perception data collected by the plurality of perception sensors, where an overall credibility score of the occupant quantifies a reliability of one or more voice-based commands generated by the occupant over time and is based on the credibility score. The one or more controllers compare the overall credibility score of the occupant with a threshold access score, and in response to determining the overall credibility score of the occupant is less than the threshold access score, adjust an access level of the voice controlled autonomous driving system for the occupant.

In another aspect, the one or more controllers execute instructions to classify the voice command represented by the text-based command as one of the following: an emergency driving situation and a regular maneuver by identifying one or more emergency keywords present within the text-based command.

In yet another aspect, in response to classifying the voice command represented by the text-based command as an emergency driving situation, the one or more controllers transmit the text-based command to the one or more autonomous driving controllers of the voice controlled autonomous driving system without confirming the occupant is an authorized user.

In an aspect, in response to determining the voice command generated by the occupant is a regular driving maneuver, confirm the occupant generating the voice command is an authorized user of the voice controlled autonomous driving system.

In another aspect, the one or more controllers are in electronic communication with an interior camera positioned to capture image data representative of a head and a face of the occupant of the vehicle.

In yet another aspect, the one or more controllers are in wireless communication with one or more user databases that store facial recognition data representative of facial features and voice recognition data representative of a voice of all authorized users of the voice controlled autonomous driving system and a library of authorized digital images that each represent a digital image of an individual who was previously authenticated as an authorized user of the voice controlled autonomous driving system.

In an aspect, the one or more controllers confirm the occupant generating the voice command is an authorized user of the voice controlled autonomous driving system by comparing the image data from the interior camera with the facial recognition data stored in the user databases, the electric signal representative of the voice command with the voice recognition data stored in the user databases, and in response to determining no match exists between the image data representative of the face of the occupant and the facial recognition data of one of the authorized users of the voice controlled autonomous driving system stored in the user databases, generate a request for a user-specific code that is a unique identifier associated with an authorized digital image of the occupant stored in the one or more user databases.

In another aspect, the one or more controllers execute instructions to compare the authorized digital image of the occupant associated with the user-specific code with the library of authorized digital images stored in the one or more user databases, and in response to determining the digital image of the occupant associated with the user-specific code does not match one of the authorized digital images stored in the one or more user databases, execute a procedure to register an authorized digital image of the occupant.

In yet another aspect, the one or more controllers execute instructions to calculate the credibility score is calculated based on the following equation:

$$\text{Creditability Score} = w_1 S_{success} - w_2 S_{stat} - w_3 S_{infeasible} - w_4 f_{user} S_{consequence}$$

where $w_1$, $w_2$, $w_3$, and $w_4$ represent weighting factors, $S_{success}$ represents a reward for each voice command generated by the occupant resulting in the corresponding pre-compiled driving maneuver being successfully executed by the vehicle and is based on the execution status, $S_{stat}$ represents a statutory penalty for each voice command generated by the occupant that results in the corresponding pre-compiled driving maneuver not being executed by the vehicle because the pre-compiled driving maneuver is not authorized based on traffic rules associated with a specific location where the vehicle is located, $S_{infeasible}$ represents a feasibility penalty for each voice command generated by the occupant that results in the driving maneuver not being executed by the vehicle because the pre-compiled driving maneuver is infeasible, $f_{user}$ represents a value indicating a fault associated with the occupant generating the voice command in the event the pre-compiled driving maneuver is successfully executed but degrades performance of the voice controlled autonomous driving system, and $S_{consequence}$ represents a consequence penalty for each voice command generated by the occupant that indicates performance degradation of the voice controlled autonomous driving system.

In an aspect, the one or more controllers execute instructions to determine the value $f_{user}$ indicating the fault associated with the occupant based on:

$$f_{user} = f(\text{time}, \text{distance}_{goal}, \text{deviation}_{params})$$

where time represents a time interval, distance$_{goal}$ represents a change in a goal state, and deviation$_{params}$ represents a degree of change between a plurality of behavior planner parameters and one or more updated behavior planner parameters.

In another aspect, the change in the goal state is determined by comparing a distance measured between an original goal location indicating a planned goal state of the vehicle originally determined by a behavior planner of the voice controlled autonomous driving system and a modified goal location indicating a modified goal state of the vehicle that is achieved after executing the pre-compiled driving maneuver.

In yet another aspect, authorization status indicates when the pre-compiled driving maneuver is authorized based on traffic rules associated with a specific location where the vehicle is located.

In an aspect, the execution status indicates that the pre-compiled driving maneuver indicated by the voice command was successfully completed by the vehicle.

In another aspect, adjusting the access level of the voice controlled autonomous driving system for the occupant includes denying access to the voice controlled autonomous driving system.

In yet another aspect, adjusting the access level of the voice controlled autonomous driving system for the occupant includes assigning a lower level of access to the voice controlled autonomous driving system, where the lower level of access only allows the occupant to control the voice controlled autonomous driving system within restricted areas.

In an aspect, a method for calculating an overall credibility score for an occupant of a vehicle by an authentication system for a voice controlled autonomous driving system is disclosed. The method includes receiving, by one or more controllers, an electrical signal representative of the voice command generated by an occupant of the vehicle, where the voice command indicates a driving maneuver that alters motion of the vehicle, and wherein the one or more controllers are in electronic communication with one or more autonomous driving controllers of the voice controlled autonomous driving system and a plurality of perception sensors and the voice controlled autonomous driving system determines a trajectory of the vehicle based on a voice command generated by an occupant of the vehicle. The method includes converting, by the one or more controllers, the electrical signal into a text-based command based on one or more speech recognition algorithms. The method includes receiving, by the one or more controllers, a pre-compiled driving maneuver indicated by the text-based command, a feasibility message indicating a feasibility of the pre-compiled driving maneuver, a statutory message indicating an authorization status of the pre-compiled driving maneuver, and an execution message indicating an execution status of the pre-compiled driving maneuver from the one or more autonomous driving controllers. The method also includes calculating, by the one or more controllers, a credibility score of the occupant based on the pre-compiled driving maneuver, the feasibility of the pre-compiled driving maneuver, the authorization status of the pre-compiled driving maneuver, the execution status of the pre-compiled driving maneuver, and perception data collected by the plurality of perception sensors, where an credibility score of the occupant quantifies a reliability of one or more voice-based commands generated by the occupant over time and is based on the credibility score. The method includes comparing, by the one or more controllers, the overall credibility score of the occupant with a threshold access score. Finally, in response to determining the overall credibility score of the occupant is less than the threshold access score, the method includes adjusting an access level of the voice controlled autonomous driving system for the occupant.

In an aspect, an authentication system for a voice controlled autonomous driving system of a vehicle is disclosed. The authentication system includes a plurality of perception sensors for collecting perception data indicative of an environment surrounding the vehicle and one or more controllers in electronic communication with one or more autonomous driving controllers of the voice controlled autonomous driving system and the plurality of perception sensors. The voice controlled autonomous driving system determines a trajectory of the vehicle based on a voice command generated by an occupant of the vehicle, where the one or more controllers execute instructions to receive an electrical signal representative of the voice command generated by an occupant of the vehicle, where the voice command indicates a driving maneuver that alters motion of the vehicle. The one or more controllers convert the electrical signal into a text-based command based on one or more speech recognition algorithms. The one or more controllers receive a pre-compiled driving maneuver indicated by the text-based command, a feasibility message indicating a feasibility of the pre-compiled driving maneuver, a statutory message indicating an authorization status of the pre-compiled driving maneuver, and an execution message indicating an execution status of the pre-compiled driving maneuver from the one or more autonomous driving controllers, where the authorization status indicates when the pre-compiled driving maneuver is authorized based on traffic rules associated with a specific location where the vehicle is located. The one or more controllers calculate a credibility score of the occupant based on the pre-compiled driving maneuver, the feasibility of the pre-compiled driving maneuver, the authorization status of the pre-compiled driving maneuver, the execution status of the pre-compiled driving maneuver, and the perception data collected by the plurality of perception sensors, where an credibility score of the occupant quantifies a reliability of one or more voice-based commands generated by the occupant over time and is based on the credibility score. The one or more controllers compare the credibility score of the occupant with a threshold access score, and in response to determining the credibility score of the occupant is less than the threshold access score, the one or more controllers adjust an access level of the voice controlled autonomous driving system for the occupant, wherein the authorization status indicates when the pre-compiled driving maneuver is authorized based on traffic rules associated with a specific location where the vehicle is located.

In another aspect, the one or more controllers execute instructions to classify the voice command represented by the text-based command as one of the following: an emergency driving situation and a regular maneuver by identifying one or more emergency keywords present within the text-based command.

In yet another aspect, in response to classifying the voice command represented by the text-based command as an emergency driving situation, the one or more controllers transmit the text-based command to the one or more autonomous driving controllers of the voice controlled autonomous driving system without confirming the occupant is an authorized user.

In an aspect, in response to determining the voice command generated by the occupant is a regular driving maneuver, the one or more controllers confirm the occupant generating the voice command is an authorized user of the voice controlled autonomous driving system.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
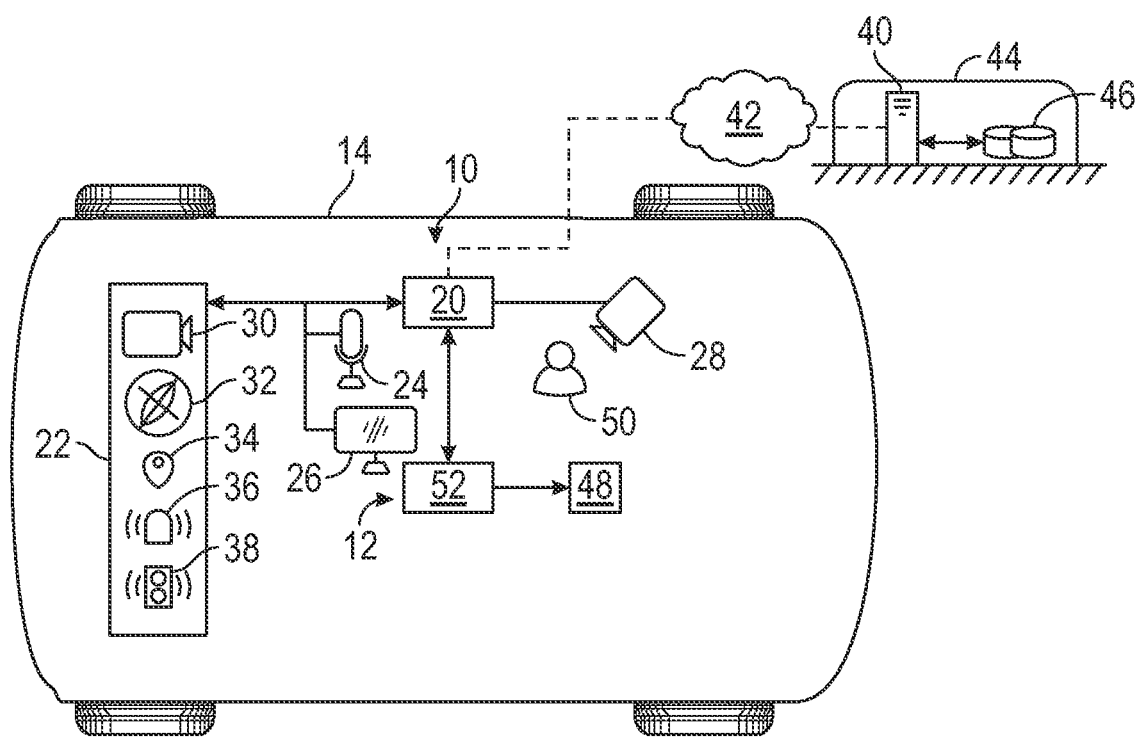
FIG. 1 is a schematic diagram of a vehicle including the disclosed authentication system including one or more controllers in electronic communication with a plurality of perception sensors and a voice controlled autonomous driving system, according to an exemplary embodiment.

Referring to FIG. 1, a schematic diagram of an exemplary authentication system 10 for a voice controlled autonomous driving system 12 of a vehicle 14 is illustrated. In embodiments, the voice controlled autonomous driving system 12 provides at least Level 2 autonomous driving control such as, for example, an advanced driver-assistance system (ADAS). It is to be appreciated that the vehicle 14 may be any type of vehicle such as, but not limited to, a sedan, truck, sport utility vehicle, van, or motor home. The authentication system 10 includes one or more controllers 20 in electronic communication with a plurality of perception sensors 22, a microphone 24, a human-machine interface (HMI) 26, and an interior camera 28. The plurality of perception sensors 22 are configured to collect perception data indicative of an environment surrounding the vehicle 14. In the non-limiting embodiment as shown in FIG. 1, the plurality of perception sensors 22 include one or more cameras 30, an inertial measurement unit (IMU) 32, a global positioning system (GPS) 34, radar 36, and LiDAR 38, however, is to be appreciated that additional sensors may be used as well.

The one or more controllers 20 are also in wireless communication with a back-end server 40 over a communication network 42, where the back-end server 40 is remotely located from the vehicle 14 as part of a back-end office 44. The back-end server 40 represents one or more computers that each include at least one processor, memory, associated input and output buses, and wireless communication capabilities. The back-end server 40 is in electronic communication with one or more user databases 46, where the one of more user databases 46 store facial recognition data representative of the facial features and voice recognition data representative of the voice of all the authorized users of the voice controlled autonomous driving system 12. The one or more user databases 46 also store a library of authorized digital images. The authorized digital images each represent a digital image of an individual who was previously authenticated as an authorized user of the voice controlled autonomous driving system 12. The one or more user databases 46 also store an overall credibility score that is associated with an occupant 50 of the vehicle 14, where the overall credibility score is described below.

The voice controlled autonomous driving system 12 determines a trajectory 48 of the vehicle 14 based on a voice command generated by an occupant 50 of the vehicle 14. The voice command generated by the occupant 50 of the vehicle 14 indicates a driving maneuver that alters motion of the vehicle 14 as the vehicle 14 is traveling. In other words, the voice command generated by the occupant 50 changes the current trajectory of the vehicle 14. Some examples of the voice command include, but are not limited to, a command to take the next exit along a highway, to make a lane change, to pass another vehicle, and to change the destination location of a route plan.

As explained below, the authentication system 10 confirms the occupant 50 generating the voice commands that determine the trajectory 48 of the vehicle 14 is an authorized user of the voice controlled autonomous driving system 12. It is to be appreciated that the voice controlled autonomous driving system 12 only accepts voice commands generated by authorized users unless the voice command indicates an emergency driving situation. In one embodiment, an emergency driving situation is a maneuver executed in response to a sudden, unexpected situation, such as another vehicle immediately crossing the path of the ego vehicle (i.e., the vehicle 14). In another embodiment, the emergency driving situation is receiving instructions to immediately stop the vehicle 14, such as when the occupant 50 indicates that he or she is experiencing motion sickness.

Once the occupant 50 is confirmed as an authorized user, the one or more controllers 20 of the authentication system 10 scores the voice commands generated by the occupant 50. As explained below, the authentication system 10 adjusts an access level of the voice controlled autonomous driving system 12 for the occupant 50 in response to determining an overall credibility score associated with the occupant 50 falls below a threshold access score. For example, the occupant 50 may generate voice commands that result in the vehicle 14 executing driving maneuvers that are not authorized, infeasible, or that result in performance degradation of the voice controlled autonomous driving system 12. Some examples of performance degradation of the voice controlled autonomous driving system 12 include, but are not limited to, takeover by a driver of the vehicle 14, active emergency braking or steering, not reaching a destination, significantly delaying the estimated time of arrival to the destination, creating a traffic incident such as a collision, or executing a driving maneuver that compromises the comfort of the occupants.

The microphone 24 represents a device that converts sound waves into electrical signals, where the electrical signals are received by the one or more controllers 20. Specifically, the microphone 24 converts a voice command generated by an occupant 50 of the vehicle 14 into an electrical signal representative of the voice command. The HMI 26 represents a user interface, where the occupant 50 of the vehicle 14 receives message from and provides user input to the voice controlled autonomous driving system 12 by the HMI 26. One example of the HMI 26 is a touchscreen that receives user input and shows images on a display to the occupant 50. The interior camera 28 is positioned to capture image data representative of the head and the face of the occupant 50 of the vehicle 14.

Figure 2:
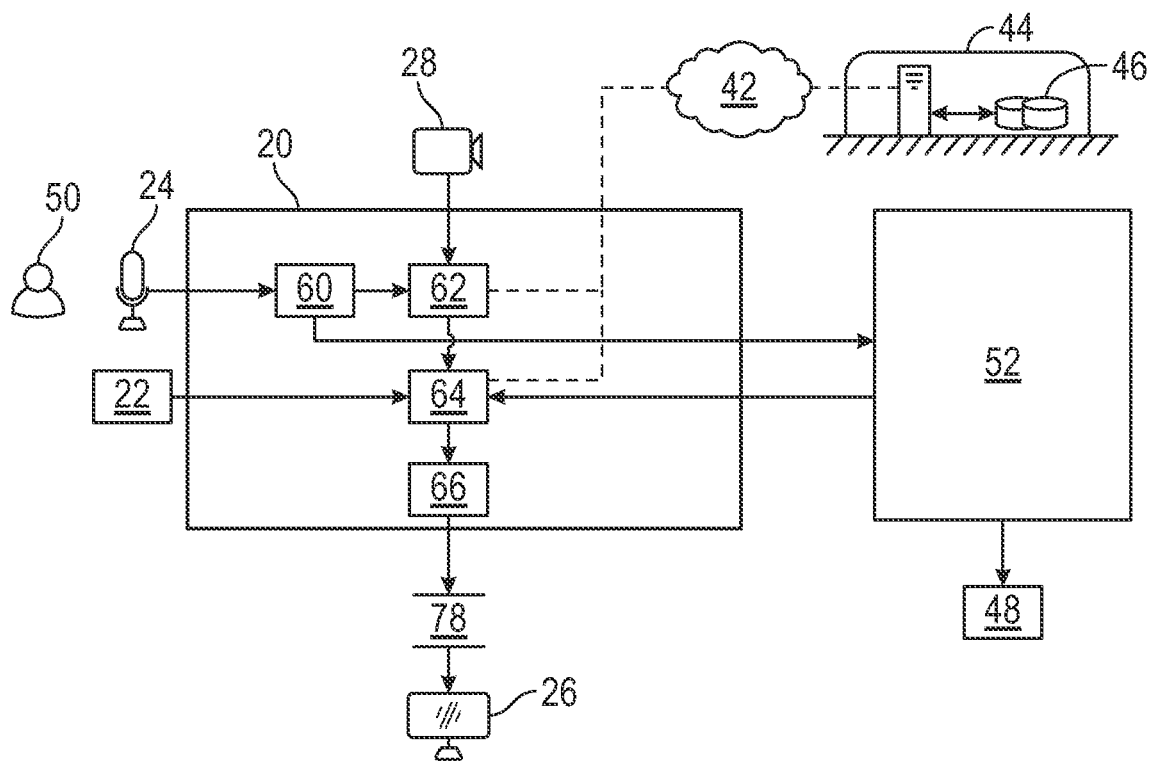
FIG. 2 illustrates the software architecture of the one or more controllers shown in FIG. 1, according to an exemplary embodiment.

FIG. 2 illustrates the software architecture of the one or more controllers 20 shown in FIG. 1, where the one or more controllers 20 are in electronic communication with one or more autonomous driving controllers 52 that are part of the voice controlled autonomous driving system 12 (FIG. 1). The one or more controllers 20 of the authentication system 10 include a voice recognition module 60, an authorization module 62, a scoring module 64, and an access module 66. In an embodiment, the voice recognition module 60 of the one or more controllers 20 receives the electrical signal representative of the voice command generated by the occupant 50 from the microphone 24 and converts the electrical signal into a text-based command based on one or more speech recognition algorithms such as, for example, the perceptual linear prediction (PLP) features, Viterbi search, and voice recognition approaches that employ deep neural networks, and discrimination training.

The voice recognition module 60 then classifies the voice command represented by the text-based command as either an emergency driving situation or a regular maneuver by identifying one or more emergency keywords present within the text-based command. The emergency keywords indicate an occupant of the vehicle 14 is attempting to execute an emergency driving situation. Some examples of the one or more emergency keywords include the words, stop, help, emergency, or phrases that indicate the occupant 50 is attempting to immediately stop the vehicle 14 such as "I am feeling sick and going to vomit, pull over". In response to determining one or more emergency keywords present within the text-based command, the voice recognition module 60 classifies the voice command as an emergency driving situation.

As mentioned above, the voice controlled autonomous driving system 12 only accepts voice commands generated by authorized users unless the voice command indicates an emergency driving situation. In response to the voice recognition module 60 classifying the voice command represented by the text-based command as an emergency driving situation, the voice recognition module 60 transmits the text-based command to the one or more autonomous driving controllers 52 of the voice controlled autonomous driving system 12, without confirming the occupant 50 is an authorized user. Otherwise, the authorization module 62 of the one or more controllers 20 confirms the occupant 50 generating the voice command is an authorized user of the voice controlled autonomous driving system 12.

The authorization module 62 of the one or more controllers 20 receives the image data from the interior camera 28 representative of the face of the occupant 50 of the vehicle 14 and the voice command represented by the text-based command generated by the occupant 50 from the voice recognition module 60. The authorization module 62 of the one or more controllers 20 also receives the facial recognition data representative of the facial features and the voice recognition data representative of the voice of all the authorized users of the voice controlled autonomous driving system 12 and the library of authorized digital images from the one or more user databases 46 over the communication network 42. In response to the voice recognition module 60 determining the voice command generated by the occupant 50 is a regular driving maneuver, the authorization module 62 confirms the occupant 50 generating the voice command is an authorized user of the voice controlled autonomous driving system 12 by comparing the image data from the interior camera 28 with the facial recognition data stored in the user databases 46, the electric signal representative of the voice command from the microphone 24 with the voice recognition data stored in the user databases 46, where a process for confirming the occupant 50 is illustrated in FIG. 3.

Figure 3:
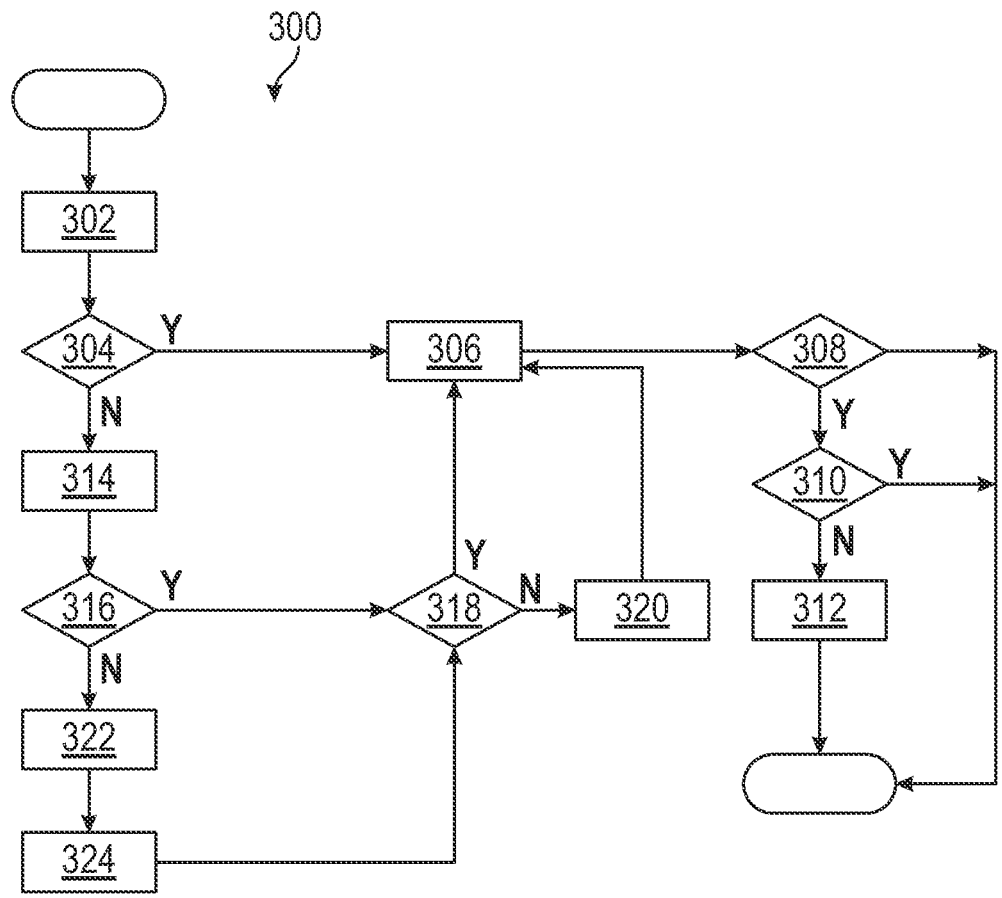
FIG. 3 illustrates a process flow diagram illustrating a method for confirming an occupant generating a voice command is an authorized user of the voice controlled autonomous driving system, according to an exemplary embodiment.

Referring now to FIG. 3, an exemplary process flow diagram illustrating a method 300 for confirming the occupant 50 generating the voice command is an authorized user of the voice controlled autonomous driving system 12 is shown. Referring generally to FIGS. 1-3, the method 300 may begin at block 302. In block 302, the authorization module 62 of the one or more controllers 20 receives the image data from the interior camera 28. The method 300 may then proceed to decision block 304.

In decision block 304, the authorization module 62 of the one or more controllers 20 executes one or more facial recognition algorithms that compare the image data from the interior camera 28 representative of the face of the occupant 50 of the vehicle 14 with the facial recognition data stored in the user databases 46. In response to determining a match between the image data representative of the face of the occupant 50 of the vehicle 14 and the facial recognition data of one of the authorized users of the voice controlled autonomous driving system 12 stored in the user databases 46, the method 300 may proceed to block 306. Otherwise, the method proceeds to block 314.

In block 306, the authorization module 62 of the one or more controllers 20 receives the electrical signal representative of the voice command generated by the occupant 50 from the microphone 24. The method 300 may then proceed to decision block 308.

In decision block 308, the authorization module 62 of the one or more controllers 20 executes one or more voice recognition algorithms that compare the electrical signal representative of the voice command generated by the occupant 50 from the microphone 24 with the voice recognition data representative of the voice of all the authorized users of the voice controlled autonomous driving system 12 stored in the one or more user databases 46. In response to determining a match between the voice command generated by the occupant 50 from the microphone 24 with the voice recognition data representative of the voice of all the authorized users of the voice controlled autonomous driving system 12, the method 300 may proceed to decision block 310. Otherwise, the method 300 may terminate.

In decision block 310, the authorization module 62 of the one or more controllers 20 confirms that the occupant 50 is still located within an interior cabin of the vehicle 14. The authorization module 62 of the one or more controllers 20 confirms the occupant 50 is still within the interior cabin of the vehicle 14 based on a variety of approaches such as, for example, determining if a door of the vehicle 14 has been opened, by one or more infrared sensors located within the interior cabin of the vehicle 14, or by monitoring the occupant 50 by the interior camera 28. In response to determining the occupant 50 has exited the vehicle 14, the method terminates. Otherwise, the method 300 proceeds to block 312.

In block 312, the authorization module 62 of the one or more controllers 20 confirms the occupant 50 generating the voice command is an authorized user of the voice controlled autonomous driving system 12. The authorization module 62 also transmits a notification to the one or more autonomous driving controllers 52 of the voice controlled autonomous driving system 12 indicating the occupant 50 is an authorized user as well. The method 300 may then terminate.

Returning to decision block 304, in response to determining no match exists between the image data representative of the face of the occupant 50 of the vehicle 14 and the facial recognition data of one of the authorized users of the voice controlled autonomous driving system 12 stored in the user databases 46, the method 300 may proceed to block 314. In block 314, the authorization module 62 of the one or more controllers 20 instructs the HMI 26 to generate a notification to the occupant 50, where the notification prompts the occupant 50 to provide user input to the HMI 26 indicating a user-specific code. The user-specific code is a unique identifier that is associated with an authorized digital image of the occupant 50 stored in the one or more user databases 46. In an embodiment, the user-specific code represents biometric data such as, for example, fingerprints or a retinal scan. The occupant 50 is required to register the authorized digital image within the one or more user databases 46 in advance of executing the method 300. In one embodiment, the user-specific code is a numeric passcode that is transmitted to a smartphone of the occupant 50 by the back-end server 40. The method 300 may then proceed to decision block 316.

In decision block 316, the authorization module 62 of the one or more controllers 20 compares the image data representative of the face of the occupant 50 with the library of authorized digital images stored in the one or more user databases 46, where the authorized digital images each represent a digital image of an individual who was previously authenticated as an authorized user of the voice controlled autonomous driving system 12. In response to determining the image data representative of the face of the occupant 50 associated with the user-specific code matches one of the authorized digital images stored in the one or more user databases 46, the method 300 may proceed to decision block 318. In block 318, the authorization module 62 checks a memory of the one or more controllers 20 for voice data representative of the voice of the occupant 50. If no recording exists, then the method 300 proceeds to block 320, and the authorization module 62 instructs the HMI 26 to generate a prompt asking the occupant 50 to create a recording. Otherwise, the method returns to block 306.

Referring to decision block 316, in response to determining the image data representative of the face of the occupant 50 does not match one of the authorized digital images stored in the one or more user databases 46, the method 300 may proceed to block 322. In block 320, the authorization module 62 executes a procedure to register an authorized digital image of the occupant 50 within the library stored in the one or more user databases 46. The procedure includes asking the occupant 50 to distinguish themselves from other occupants in the vehicle 14 by performing actions such as, for example, raising his or her hand. The method 300 may then proceed to block 322, where authorized digital image of the occupant 50 is added to the library stored in the one or more user databases 46. The method 300 may then return to decision block 318.

Referring to FIG. 2, in response to confirming the occupant 50 generating the voice command is an authorized user of the voice controlled autonomous driving system 12, the authorization module 62 of the one or more controllers 20 sends a confirmation message and the text-based command representing the voice command to the one or more controllers 20 of the voice controlled autonomous driving system 12, where the confirmation message indicates the occupant 50 is an authorized user. As explained below, the scoring module 64 of the one or more controllers 20 receive a pre-compiled driving maneuver that is indicated by the text-based command representing the voice command, a feasibility message indicating a feasibility of the pre-compiled driving maneuver, a statutory message indicating an authorization status of the pre-compiled driving maneuver, and an execution message indicating an execution status of the pre-compiled driving maneuver from the one or more autonomous driving controllers 52 of the voice controlled autonomous driving system 12. As explained below, in response to determining the pre-compiled driving maneuver is successfully executed, the scoring module 64 calculates a consequence penalty indicating a potential performance degradation caused by executing the pre-compiled driving maneuver based on the perception data collected by the plurality of perception sensors 22 (FIG. 1).

The scoring module 64 calculates the credibility score of the occupant 50 based on the input from the one or more autonomous driving controllers 52 of the voice controlled autonomous driving system 12 and the perception data collected by the plurality of perception sensors 22. The credibility score of the occupant 50 is combined with the previous credibility score associated with the occupant 50 that is stored on the one or more user databases 46. The overall credibility score quantifies the reliability of the occupant 50 over time. For example, if the occupant 50 continuously generates voice-based commands that instruct the vehicle 14 to increase its speed over the current speed limit, or to execute a driving maneuver while driving autonomously that requires driver intervention, then the overall credibility score of the occupant 50 would decrease.

The one or more autonomous driving controllers 52 of the voice controlled autonomous driving system 12 classifies the text-based command representing the voice command into one of a plurality of pre-compiled driving maneuvers based on one or more machine learning algorithms in response to receiving the confirmation message by the authorization module 62 of the one or more controllers 20. In an embodiment, the one or more autonomous driving controllers 52 classifies the text-based command based on a neural network trained to classify the text-based command. The pre-compiled driving maneuvers represent a list of potential driving maneuvers that the vehicle 14 has the potential to execute. Some examples of the potential driving maneuvers include, but are not limited to, a command to take the next exit, to make a lane change (either a left-hand lane change or a right-hand lane change), and to pass another vehicle (either by the left lane or the right lane). It is to be appreciated that in some instances, the text-based command represents a driving maneuver that is not possible to execute or is infeasible. For example, if the voice command instructs the vehicle 14 to fly over traffic, this would be a driving maneuver that is infeasible.

In the event the one or more autonomous driving controllers 52 are unable to classify the text-based command representing the voice command into one of the plurality of pre-compiled driving maneuvers because the driving maneuver is infeasible, the one or more autonomous driving controllers 52 transmit a feasibility message to the scoring module 64 of the one or more controllers 20 indicating the pre-compiled driving maneuver is unable to be accurately classified into one of the pre-compiled driving maneuvers and is infeasible. In response to classifying the text-based command representing the voice command into one of the plurality of pre-compiled driving maneuvers, the one or more autonomous driving controllers 52 transmits a feasibility message to the scoring module 64 of the one or more controllers 20 indicating the pre-compiled driving maneuver is feasible.

In addition to the pre-compiled driving maneuver, the one or more autonomous driving controllers 52 of the voice controlled autonomous driving system 12 also transmits a statutory message to the scoring module 64 of the authentication system 10, where the statutory message indicates an authorization status of the pre-compiled driving maneuver. The authorization status indicates when the pre-compiled driving maneuver is authorized based on the traffic rules associated with the specific location where the vehicle 14 is located. The one or more autonomous driving controllers 52 of the voice controlled autonomous driving system 12 stores a set of traffic rules associated with a specific location where the vehicle 14 is currently located in memory. The set of traffic rules indicate regulatory rules such as, for example, a speed limit associated with the road the vehicle 14 is presently traveling along, and if passing within a current lane of travel is permitted.

The one or more autonomous driving controllers 52 of the voice controlled autonomous driving system 12 compares the pre-compiled driving maneuver with the traffic rules associated with the specific location of the vehicle 14. In response to determining the pre-compiled driving maneuver is not authorized based on the traffic rules associated with the specific location where the vehicle 14 is located, the one or more autonomous driving controllers 52 generate a statutory message indicating the pre-compiled driving maneuver is not authorized. Similarly, in response to determining the pre-compiled driving maneuver is authorized based on the traffic rules associated with the specific location where the vehicle 14 is located, the one or more autonomous driving controllers 52 generate a statutory message indicating the pre-compiled driving maneuver is authorized.

The scoring module 64 of the one or more controllers 20 also receive the execution message indicating an execution status of the pre-compiled driving maneuver from the one or more autonomous driving controllers 52 of the voice controlled autonomous driving system 12. The execution status indicates that the pre-compiled driving maneuver indicated by the voice command was successfully completed by the vehicle 14. The scoring module 64 of the one or more controllers 20 calculates the credibility score of the occupant 50 based on the pre-compiled driving maneuver indicated by the text-based command representing the voice command, the feasibility message indicating the feasibility of the pre-compiled driving maneuver, the statutory message indicating the authorization status of the pre-compiled driving maneuver, and the execution message indicating the execution status of the pre-compiled driving maneuver from the one or more autonomous driving controllers 52 of the voice controlled autonomous driving system 12, and the perception data from the one or more perception sensors 22.

In an embodiment, the credibility score is calculated based on Equation 1, which is as follows:

$$\text{Creditability Score} = w_1 S_{success} - w_2 S_{stat} - w_3 S_{infeasible} - w_4 f_{user} S_{consequence} \quad \text{Equation 1}$$

where $w_1$, $w_2$, $w_3$, and $w_4$ represent weighting factors that range in value from 0 to 1. $S_{success}$ represents a reward for each voice command generated by the occupant 50 that results in the corresponding pre-compiled driving maneuver being successfully executed by the vehicle 14 and is determined based on the execution status indicated by the execution message. $S_{stat}$ represents a statutory penalty for each voice command generated by the occupant 50 that results in the corresponding pre-compiled driving maneuver not being executed by the vehicle 14 because the pre-compiled driving maneuver is not authorized based on the traffic rules associated with the specific location where the vehicle 14 is located. The statutory penalty $S_{stat}$ is determined based on the authorization status of the pre-complied driving maneuver indicated by the statutory message. $S_{infeasible}$ represents a feasibility penalty for each voice command generated by the occupant 50 that is not among the plurality of pre-compiled driving maneuvers and is infeasible. The feasibility penalty $S_{infeasible}$ is determined based on the feasibility message. $f_{user}$ represents a value indicating a fault associated with the occupant 50 generating the voice command in the event the pre-compiled driving maneuver is successfully executed but degrades performance of the voice controlled autonomous driving system 12, and is determined based on Equation 2, which is explained below.

$S_{consequence}$ represents the consequence penalty for each voice command generated by the occupant 50 that indicates the potential performance degradation caused by executing the pre-compiled driving maneuver and is determined by the scoring module 64 based on the perception data collected by the perception sensors 22 (FIG. 1). As mentioned above, some examples of the potential performance degradation caused by executing the pre-compiled driving maneuver include, but are not limited to, takeover by a driver of the vehicle 14, active emergency braking or steering, not reaching a destination, significantly delaying the estimated time of arrival to the destination, creating a traffic incident such as a collision, or executing a driving maneuver that compromises the comfort of the occupants.

Calculating the value $f_{user}$ indicating the fault associated with the occupant 50 generating the voice command in the event the pre-compiled driving maneuver is successfully executed but degrades performance of the voice controlled autonomous driving system 12 shall now be described. The value $f_{user}$ is determined based on feedback messages from the one or more autonomous driving controllers 52 of the voice controlled autonomous driving system 12. Specifically, the value $f_{user}$ is calculated based on a time interval measured from a first point in time when the pre-compiled driving maneuver is successfully executed and a second point in time when a performance degradation of the voice controlled autonomous driving system 12 is detected, a change in a goal state of a behavior planner of the voice controlled autonomous driving system 12 created by the voice command generated by the occupant 50, and a degree of change between a default values for a plurality of behavior planner parameters and one or more updated behavior planner parameters, where the performance degradation, the default values of the plurality of behavior planner parameters, and the one or more updated behavior planner parameters are received from the one or more autonomous driving controllers 52. As the time interval increases in value, the value $f_{user}$ indicating the fault associated with the occupant 50 generating the voice command decreases. It is to be appreciated that as the degree of change between the plurality of behavior planner parameters and the one or more updated behavior planner parameters increases the value $f_{user}$ indicating the fault associated with the occupant 50 generating the voice command increases as well.

In an embodiment, the value $f_{user}$ indicating the fault associated with the occupant 50 is determined based on Equation 2, which is:

$$f_{user} = f(\text{time}, \text{distance}_{goal}, \text{deviation}_{params}) \quad \text{Equation 2}$$

where time represents the time interval, $\text{distance}_{goal}$ represents the change in the goal state, and $\text{deviation}_{params}$ represents the degree of change between the plurality of behavior planner parameters and the one or more updated behavior planner parameters.

Figure 4:
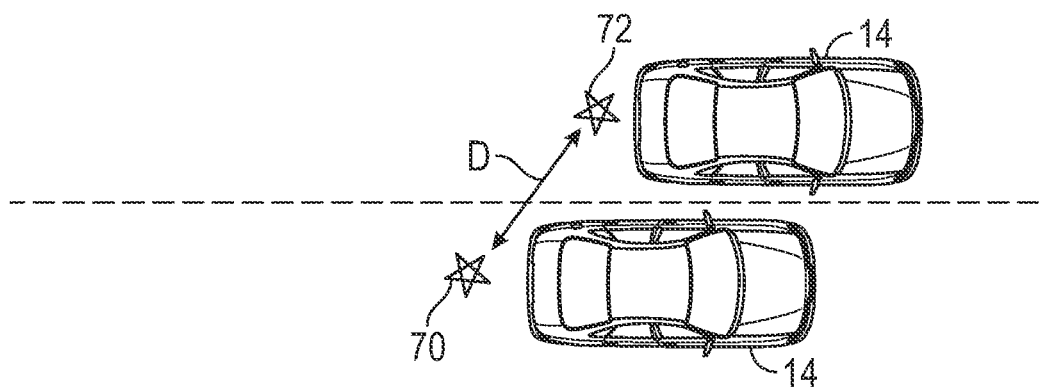
FIG. 4 is a diagram illustrating a change in a goal state of a behavior planner of the voice controlled autonomous driving system, according to an exemplary embodiment.

FIG. 4 is a diagram illustrating the change in the goal state of the behavior planner of the voice controlled autonomous driving system 12, where the change in the goal state is determined by comparing a distance D measured between an original goal location 70 and a modified goal location 72. The original goal location 70 indicates a planned goal state of the vehicle 14 that was originally determined by the behavior planner of the voice controlled autonomous driving system 12 and the modified goal location 72 indicates a modified goal state of the vehicle 14 that is achieved after executing the pre-compiled driving maneuver. It is to be appreciated that the value $f_{user}$ indicating the fault associated with the occupant 50 generating the voice command increases as the distance D measured between the original goal location 70 and a modified goal location 72 increases.

Referring to FIG. 2, the access module 66 of the one or more controllers 20 receives the overall credibility score from the scoring module 64. The access module 66 of the one or more controllers 20 compares the overall credibility score of the occupant 50 with a threshold access score. The threshold access score indicates a minimum reliability of the occupant that is required to operate the voice controlled autonomous driving system 12. In response to determining the overall credibility score of the occupant 50 is less than the threshold access score, the access module 66 of the one or more controllers 20 adjust an access level of the voice controlled autonomous driving system 12 for the occupant 50.

In one embodiment, adjusting the access level of the voice controlled autonomous driving system 12 for the occupant 50 includes denying access to the voice controlled autonomous driving system 12. For example, the access module 66 of the one or more controllers 20 may instruct the HMI 26 to generate a notification 78 to the occupant 50, where the notification 78 informs the occupant 50 that access is denied to the voice controlled autonomous driving system 12. In an embodiment, the notification 78 may inform the occupant 50 to take remedial action to regain access to the voice controlled autonomous driving system 12 such as, for example, taking specialized autonomous navigation lessons.

In another embodiment, adjusting the access level of the voice controlled autonomous driving system 12 for the occupant 50 includes assigning a lower level of access to the voice controlled autonomous driving system 12, where the lower level of access only allows the occupant 50 to control the voice controlled autonomous driving system 12 within restricted areas. The restricted areas include, but are not limited to, a restricted radius from a residence of the occupant 50 and roads having a speed limit under a threshold speed. For example, the lower level of access may allow the occupant 50 to control the voice controlled autonomous driving system 12 on roads having a speed limit that is under a highway speed (which is about 100 kilometers per hour or more). The access module 66 of the one or more controllers 20 may instruct the HMI 26 to generate a notification 78 to the occupant 50, where the notification 78 informs the occupant 50 that access to the voice controlled autonomous driving system 12 has been denied or limited.

In response to determining the overall credibility score of the occupant 50 is greater than the threshold access score, the access module 66 of the one or more controllers 20 compares the overall credibility score of the occupant 50 with a threshold warning score. The threshold warning score is greater than the threshold access score and indicates a current credibility score of the occupant is reduced and is within a predefined margin of the threshold access score required to operate the voice controlled autonomous driving system 12. In response to determining the overall credibility score of the occupant 50 is less than the threshold warning score, the access module 66 of the one or more controllers 20 instructs the HMI 26 to generate a notification 78 to the occupant 50, where the notification 78 warns the occupant 50 the current credibility score is reduced and may eventually be denied.

Figure 5:
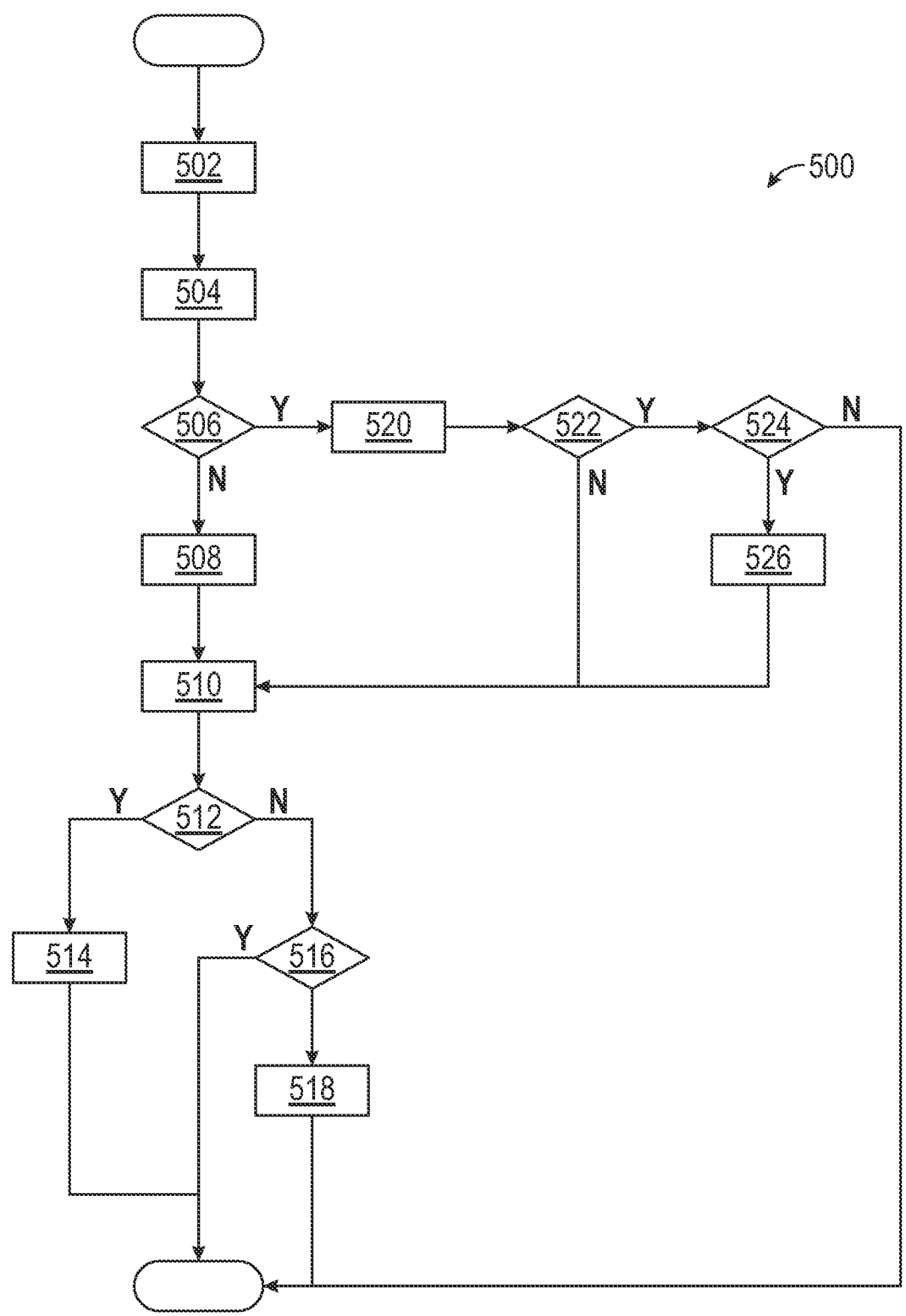
FIG. 5 is a process flow diagram illustrating a method for scoring the voice commands generated by the occupant of the vehicle, according to an exemplary embodiment.

FIG. 5 is an exemplary process flow diagram illustrating a method 500 for scoring the voice commands generated by the occupant 50. Referring generally to FIGS. 1, 2, and 5, the method 500 may begin at block 502. In block 502, the authorization module 62 determines the occupant 50 is an authorized user of the voice controlled autonomous driving system 12. The method 500 may then proceed to block 504.

In block 504, the scoring module 64 of the one or more controllers 20 receives the pre-compiled driving maneuver that is indicated by the text-based command representing the voice command, the feasibility message indicating the feasibility of the pre-compiled driving maneuver, the statutory message indicating the authorization status of the pre-compiled driving maneuver, and the execution message indicating the execution status of the pre-compiled driving maneuver from the one or more autonomous driving controllers 52 of the voice controlled autonomous driving system 12. The scoring module 64 of the one or more controllers 20 also receives the perception data from the plurality of perception sensors 22. The method 500 may then proceed to decision block 506.

In decision block 506, the scoring module 64 of the one or more controllers 20 determines if the pre-compiled driving maneuver was feasible and statutory based on the feasibility indicated by the feasibility message, the authorization status indicated by the statutory message. In response to determining the pre-compiled driving maneuver was not successfully executed, the method 500 may proceed to block 508.

In block 508, the scoring module 64 of the one or more controllers 20 calculates the credibility score of the occupant 50. Specifically, the statutory penalty $S_{stat}$ and the feasibility penalty $S_{infeasible}$ of the credibility score are calculated. The method 500 may then proceed to block 510.

In block 510, the overall credibility score of the occupant 50 is updated 50 is updated based on the current credibility score determined by the scoring module 64 for the voice command under process. It is to be appreciated that in embodiments, the overall credibility score of the occupant 50 is saved in the one or more user databases 46 and is downloaded through the communication network 42 and updated. The method 500 may then proceed to decision block 512.

In decision block 512, the access module 66 of the one or more controllers 20 compares the overall credibility score of the occupant 50 with the threshold access score. In response to determining the overall credibility score of the occupant 50 is less than the threshold access score, the method 500 may then proceed to block 514.

In block 514, the access module 66 of the one or more controllers 20 adjusts the access level of the voice controlled autonomous driving system 12 for the occupant 50. In one embodiment, the access module 66 of the one or more controllers 20 may instruct the HMI 26 to generate a notification 78 informing the occupant 50 that access is denied to the voice controlled autonomous driving system 12. The method 500 may then terminate.

Referring to decision block 512, in response to determining the overall credibility score of the occupant 50 is greater than the threshold access score, the method proceeds to decision block 516.

In decision block 516, the access module 66 of the one or more controllers 20 compares the overall credibility score of the occupant 50 with the threshold warning score. In response to determining the overall credibility score is greater than the threshold warning score, the method terminates. In response to determining the overall credibility score of the occupant 50 is less than the threshold warning score, the method proceeds to block 518.

In block 518, the access module 66 of the one or more controllers 20 instructs the HMI 26 to generate a notification 78 to the occupant 50, where the notification 78 warns the occupant 50 the overall credibility score is reduced and may eventually be denied. The method 500 may then terminate.

Returning to block 506, in response to determining the pre-compiled driving maneuver was feasible and statutory, the method 500 may proceed to block 520. In block 520, the scoring module 64 of the one or more controllers 20 determines the reward $S_{success}$ based on the execution status indicated by the execution message. The method 500 may then proceed to decision block 522.

In decision block 522, the scoring module 64 determines if the pre-compiled driving maneuver was successfully executed by the vehicle 14 based on the execution message (e.g., if the execution status is equal to 1, then the pre-compiled driving maneuver was successfully executed, if the execution status is equal to 0 then the pre-compiled driving maneuver was not successfully executed). If the pre-compiled driving maneuver was not successfully executed, then the method 500 returns to block 510, otherwise the method proceeds to decision block 524.

In decision block 524, the scoring module 64 of the one or more controllers 20 determines whether the voice command generated by the occupant 50 resulted in performance degradation of the voice controlled autonomous driving system 12. In response to determining no performance degradation exists, the method 500 may terminate. Otherwise, the method 500 may proceed to block 526.

In block 526, the scoring module 64 of the one or more controllers 20 determine the consequence penalty $S_{consequence}$ indicating the potential performance degradation caused by executing the pre-compiled driving maneuver and the value $f_{user}$ indicating the fault associated with the occupant 50 generating the voice command. The method 500 may then return to block 510.

Referring generally to the figures, the disclosed authentication system provides various technical effects and benefits. Specifically, the disclosed authentication system provides an approach to verify the occupant is an authorized user of the voice controlled autonomous driving system. In the event the occupant is an authorized user, the authentication system also provides an approach to calculate a credibility score associated with the occupant. In the event the credibility score indicates the occupant is not trained or has the level of responsibility required to control the trajectory of the vehicle based on voice commands, the disclosed authorization system may either revoke or limit access to the voice controlled autonomous driving system.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An authentication system for a voice controlled autonomous driving system of a vehicle, the authentication system comprising:
   a plurality of perception sensors for collecting perception data indicative of an environment surrounding the vehicle;
   one or more controllers in electronic communication with one or more autonomous driving controllers of the voice controlled autonomous driving system and the plurality of perception sensors, wherein the voice controlled autonomous driving system determines a trajectory of the vehicle based on a voice command generated by an occupant of the vehicle, wherein the one or more controllers execute instructions to:
      receive an electrical signal representative of the voice command generated by an occupant of the vehicle, wherein the voice command indicates a driving maneuver that alters motion of the vehicle;
      convert the electrical signal into a text-based command based on one or more speech recognition algorithms;
      receive a pre-compiled driving maneuver indicated by the text-based command, a feasibility message indicating a feasibility of the pre-compiled driving maneuver, a statutory message indicating an authorization status of the pre-compiled driving maneuver, and an execution message indicating an execution status of the pre-compiled driving maneuver from the one or more autonomous driving controllers;
      calculate a credibility score of the occupant based on the pre-compiled driving maneuver, the feasibility of the pre-compiled driving maneuver, the authorization status of the pre-compiled driving maneuver, the execution status of the pre-compiled driving maneuver, and the perception data collected by the plurality of perception sensors, wherein an overall credibility score of the occupant quantifies a reliability of one or more voice-based commands generated by the occupant over time and is based on the credibility score;
      compare the overall credibility score of the occupant with a threshold access score; and
      in response to determining the overall credibility score of the occupant is less than the threshold access score, adjust an access level of the voice controlled autonomous driving system for the occupant.

2. The authentication system of claim 1, wherein the one or more controllers execute instructions to:
   classify the voice command represented by the text-based command as one of the following: an emergency driving situation and a regular maneuver by identifying one or more emergency keywords present within the text-based command.

3. The authentication system of claim 2, wherein the one or more controllers execute instructions to:
   in response to classifying the voice command represented by the text-based command as an emergency driving situation, transmit the text-based command to the one or more autonomous driving controllers of the voice controlled autonomous driving system without confirming the occupant is an authorized user.

4. The authentication system of claim 2, wherein the one or more controllers execute instructions to:
   in response to determining the voice command generated by the occupant is a regular driving maneuver, confirm the occupant generating the voice command is an authorized user of the voice controlled autonomous driving system.

5. The authentication system of claim 4, wherein the one or more controllers are in electronic communication with an interior camera positioned to capture image data representative of a head and a face of the occupant of the vehicle.

6. The authentication system of claim 5, wherein the one or more controllers are in wireless communication with one or more user databases that store facial recognition data representative of facial features and voice recognition data representative of a voice of all authorized users of the voice controlled autonomous driving system and a library of authorized digital images that each represent a digital image of an individual who was previously authenticated as an authorized user of the voice controlled autonomous driving system.

7. The authentication system of claim 6, wherein the one or more controllers confirm the occupant generating the voice command is an authorized user of the voice controlled autonomous driving system by:
   comparing the image data from the interior camera with the facial recognition data stored in the user databases, the electric signal representative of the voice command with the voice recognition data stored in the user databases; and
   in response to determining no match exists between the image data representative of the face of the occupant and the facial recognition data of one of the authorized users of the voice controlled autonomous driving system stored in the user databases, generate a request for a user-specific code that is a unique identifier associated with an authorized digital image of the occupant stored in the one or more user databases.

8. The authentication system of claim 7, wherein the one or more controllers execute instructions to:
   compare the authorized digital image of the occupant associated with the user-specific code with the library of authorized digital images stored in the one or more user databases; and
   in response to determining the digital image of the occupant associated with the user-specific code does not match one of the authorized digital images stored in the one or more user databases, execute a procedure to register an authorized digital image of the occupant.

9. The authentication system of claim 1, wherein the one or more controllers execute instructions to:
   calculate the credibility score is calculated based on the following equation:

$$\text{Creditability Score} = w_1 S_{success} - w_2 S_{stat} - w_3 S_{infeasible} - w_4 f_{user} S_{consequence}$$

wherein $w_1$, $w_2$, $w_3$, and $w_4$ represent weighting factors, $S_{success}$ represents a reward for each voice command generated by the occupant resulting in the corresponding pre-compiled driving maneuver being successfully executed by the vehicle and is based on the execution status, $S_{stat}$ represents a statutory penalty for each voice command generated by the occupant that results in the corresponding pre-compiled driving maneuver not being executed by the vehicle because the pre-compiled driving maneuver is not authorized based on traffic rules associated with a specific location where the vehicle is located, $S_{infeasible}$ represents a feasibility penalty for each voice command generated by the occupant that results in the driving maneuver not being executed by the vehicle because the pre-compiled driving maneuver is infeasible, $f_{user}$ represents a value indicating a fault associated with the occupant generating the voice command in the event the pre-compiled driving maneuver is successfully executed but degrades performance of the voice controlled autonomous driving system, and $S_{consequence}$ represents a consequence penalty for each voice command generated by the occupant that indicates performance degradation of the voice controlled autonomous driving system.

10. The authentication system of claim 9, wherein the one or more controllers execute instructions to:
   determine the value $f_{user}$ indicating the fault associated with the occupant based on:

$$f_{user} = f(\text{time}, \text{distance}_{goal}, \text{deviation}_{params})$$

wherein time represents a time interval, $\text{distance}_{goal}$ represents a change in a goal state, and $\text{deviation}_{params}$ represents a degree of change between a plurality of behavior planner parameters and one or more updated behavior planner parameters.

11. The authentication system of claim 10, wherein the change in the goal state is determined by comparing a distance measured between an original goal location indicating a planned goal state of the vehicle originally determined by a behavior planner of the voice controlled autonomous driving system and a modified goal location indicating a modified goal state of the vehicle that is achieved after executing the pre-compiled driving maneuver.

12. The authentication system of claim 1, wherein the authorization status indicates when the pre-compiled driving maneuver is authorized based on traffic rules associated with a specific location where the vehicle is located.

13. The authentication system of claim 1, wherein the execution status indicates that the pre-compiled driving maneuver indicated by the voice command was successfully completed by the vehicle.

14. The authentication system of claim 1, wherein adjusting the access level of the voice controlled autonomous driving system for the occupant includes denying access to the voice controlled autonomous driving system.

15. The authentication system of claim 1, wherein adjusting the access level of the voice controlled autonomous driving system for the occupant includes assigning a lower level of access to the voice controlled autonomous driving system, wherein the lower level of access only allows the occupant to control the voice controlled autonomous driving system within restricted areas.

16. A method for calculating an overall credibility score for an occupant of a vehicle by an authentication system for a voice controlled autonomous driving system, the method comprising:
   receiving, by one or more controllers, an electrical signal representative of the voice command generated by an occupant of the vehicle, wherein the voice command indicates a driving maneuver that alters motion of the vehicle, and wherein the one or more controllers are in electronic communication with one or more autonomous driving controllers of the voice controlled autonomous driving system and a plurality of perception sensors and the voice controlled autonomous driving system determines a trajectory of the vehicle based on a voice command generated by an occupant of the vehicle;
   converting, by the one or more controllers, the electrical signal into a text-based command based on one or more speech recognition algorithms;
   receiving, by the one or more controllers, a pre-compiled driving maneuver indicated by the text-based command, a feasibility message indicating a feasibility of the pre-compiled driving maneuver, a statutory message indicating an authorization status of the pre-compiled driving maneuver, and an execution message indicating an execution status of the pre-compiled driving maneuver from the one or more autonomous driving controllers;
   calculating, by the one or more controllers, a credibility score of the occupant based on the pre-compiled driving maneuver, the feasibility of the pre-compiled driving maneuver, the authorization status of the pre-compiled driving maneuver, the execution status of the pre-compiled driving maneuver, and perception data collected by the plurality of perception sensors, wherein the overall credibility score of the occupant quantifies a reliability of one or more voice-based commands generated by the occupant over time and is based on the credibility score;
   comparing, by the one or more controllers, the overall credibility score of the occupant with a threshold access score; and
   in response to determining the overall credibility score of the occupant is less than the threshold access score, adjusting an access level of the voice controlled autonomous driving system for the occupant.

17. An authentication system for a voice controlled autonomous driving system of a vehicle, the authentication system comprising:
   a plurality of perception sensors for collecting perception data indicative of an environment surrounding the vehicle;
   one or more controllers in electronic communication with one or more autonomous driving controllers of the voice controlled autonomous driving system and the plurality of perception sensors, wherein the voice controlled autonomous driving system determines a trajectory of the vehicle based on a voice command generated by an occupant of the vehicle, wherein the one or more controllers execute instructions to:
      receive an electrical signal representative of the voice command generated by an occupant of the vehicle, wherein the voice command indicates a driving maneuver that alters motion of the vehicle;
      convert the electrical signal into a text-based command based on one or more speech recognition algorithms;
      receive a pre-compiled driving maneuver indicated by the text-based command, a feasibility message indicating a feasibility of the pre-compiled driving maneuver, a statutory message indicating an authorization status of the pre-compiled driving maneuver, and an execution message indicating an execution status of the pre-compiled driving maneuver from the one or more autonomous driving controllers, wherein the authorization status indicates when the pre-compiled driving maneuver is authorized based on traffic rules associated with a specific location where the vehicle is located;
      calculate a credibility score of the occupant based on the pre-compiled driving maneuver, the feasibility of the pre-compiled driving maneuver, the authorization status of the pre-compiled driving maneuver, the execution status of the pre-compiled driving maneuver, and the perception data collected by the plurality of perception sensors, wherein an overall credibility score of the occupant quantifies a reliability of one or more voice-based commands generated by the occupant over time and is based on the credibility score;

compare the overall credibility score of the occupant with a threshold access score; and in response to determining the overall credibility score of the occupant is less than the threshold access score, adjust an access level of the voice controlled autonomous driving system for the occupant, wherein the authorization status indicates when the pre-compiled driving maneuver is authorized based on traffic rules associated with a specific location where the vehicle is located.

18. The authentication system of claim 17, wherein the one or more controllers execute instructions to:

classify the voice command represented by the text-based command as one of the following: an emergency driving situation and a regular maneuver by identifying one or more emergency keywords present within the text-based command.

19. The authentication system of claim 18, wherein the one or more controllers execute instructions to:

in response to classifying the voice command represented by the text-based command as an emergency driving situation, transmit the text-based command to the one or more autonomous driving controllers of the voice controlled autonomous driving system without confirming the occupant is an authorized user.

20. The authentication system of claim 18, wherein the one or more controllers execute instructions to:

in response to determining the voice command generated by the occupant is a regular driving maneuver, confirm the occupant generating the voice command is an authorized user of the voice controlled autonomous driving system.

* * * * *